Patented Aug. 13, 1940

2,211,153

UNITED STATES PATENT OFFICE 2,211,153

NEUTRAL REFRIGERATING SOLUTION

Harry A. Noyes, Waban, Mass., assignor, by mesne assignments, to Z Pack Corporation, Jersey City, N. J., a corporation of Delaware No Drawing. Application November 4, 1938, Serial No. 238,800

11 Claims. (Cl. 99—198)

This invention relates to processes for preserving food products and particularly to processes and refrigerants for preserving food stuffs, such as, for example, meats, fruits and vegetables by freezing or solidification.

Freezing or solidification of food products and subsequent storage at temperatures of 15° F. or lower, depending upon the product, have been found to preserve food stuffs adequately for considerable periods of time. Of the many freezing procedures in use, those which are known as "quick freezing" processes produce the best products. As understood "in the trade," quick freezing consists in freezing articles at such a rate that the water contained therein is frozen so rapidly that large ice crystals are not formed in the article.

One method of quick freezing consists of subjecting food stuffs, either as individual units or in pieces to direct contact with a rapidly moving refrigerated liquid. This type of freezing operation has many features which recommend its use. For example, direct contact freezing is very rapid and the products are not crushed or mutilated. On the other hand, however, refrigerating liquids which can be used at zero degree Fahrenheit or lower as, for example, sodium chloride brine, may permeate the food stuffs either before the product is reduced to a frozen condition or while the frozen product is held in storage. The presence of an appreciable quantity of sodium chloride undesirably flavors and changes the color characteristics of many food stuffs. In order to avoid this, other freezing point depressants, such as, for example, glycerine, alcohols and other organic substances, have been tried from time to time. In addition to their effects on the food stuffs, economic considerations, as well as food standards, make it inadvisable to use a number of these substances. Solutions of some substances that are otherwise satisfactory may have too great a viscosity to be employed as freezing agents except in concentrations and within temperature ranges which must be too closely controlled to allow them to be used other than in the laboratory.

The U. S. Patent No. 1,532,931 describes an immersion freezing process utilizing sodium chloride brine as a freezing agent or refrigerant. Mention is made that organic materials such as, for example, glycerine, carbohydrates and the like, may be added to the sodium chloride brine freezing solution in order to render the refrigerant compatible with the food stuffs.

The U. S. Patent No. 1,894,813 discloses a refrigerating agent consisting of sodium chloride brine to which saccharine matter, such as a solution of syrup, sugar, molasses or glucose, may be added to render the refrigerant suitable for treating fruits or berries.

Each of the patents mentioned above shows a recognition of the undesirable properties of sodium chloride brines and suggests, in a general and indefinite way, methods of improving such brines for refrigerating purposes. These patents fall short of suggesting an adequate solution to the problem of producing a refrigerant which is not undesirably flavored and which, at the same time, is capable of being used at suitable refrigerating temperatures. It is well known that when a given amount of water has dissolved all of the substance that it can at a given temperature, it will still dissolve other substances. It is likewise recognized that the rates at which substances go into solution increase, for most substances, in accordance with the degree of unsaturation of the solution and as the temperature of the solvent is increased. When sodium chloride brine is used as a refrigerating agent, the difficulties resulting from the flavor that the brine imparts to the products have led workers in the refrigerating industry to strive to keep the brine at eutectic strength. If an attempt is made to dissolve other salts or compounds, such as for example sugars, in water which contains a substantially eutectic concentration of sodium chloride, the rate at which these substances will dissolve is very slow. In some cases the substance dissolves so slowly that no appreciable amount of the substance will be dissolved in the solution in the time that is required to freeze a batch of a given food stuff. If the substance which is added to the sodium chloride solution is finely divided it can be pumped around with the sodium chloride solution in a solid condition. Thus, instead of freezing with a solution of a plurality of substances, the freezing actually takes place with a mixture of solid and solution. Added to the above difficulty is the fact that when solutions are nearly saturated, an added soluble substance has some effect on the solubility of the first substance and for that reason there may, in some instances, be a tendency for the sodium chloride or other substance to crystallize out of such solutions and deposit on the surface of the product to be frozen.

Such concentrated sodium chloride solutions even having added sweetening material such as, for example, sugars, therefore will adversely flavor the products being refrigerated unless they are properly proportioned and prepared.

The principal object of this invention, therefore, is to provide a freezing solution and a method for using the same whereby the constituents of the freezing solution do not adversely affect but rather favor the desirable characteristics of the food stuffs that are frozen.

Another object of the invention is to provide a process for freezing or solidifying food stuffs employing a solution made from sugar or sugars, water and sodium chloride whereby the food products after freezing, storage and proper defrosting will have added sugar and sodium chloride contents comparable to the amounts that have been found desirable in the same products when canned.

Another object of the invention is to provide a refrigerant containing a sufficient amount of sodium chloride to reduce the expense of freezing without containing sufficient sodium chloride to render the frozen products objectionable to the consumer.

Another object of the present invention is to provide a process of refrigerating food products utilizing a novel sodium chloride-containing refrigerant whereby the food products will have the appearance of fresh articles and a flavor comparable or superior to that of the fresh food.

Another object of the invention is to provide a quick freezing process which utilizes a refrigerant containing sodium chloride and sugar which is inexpensive, stable to changes in temperature, fluid at low temperatures and which will not impart an undesirable flavor to the products that are being frozen.

Another object of the invention is to provide a process of making a refrigerant containing sodium chloride and sugar, which is characterized by a neutral flavor that will not adversely affect the flavor of products with which the refrigerant comes into contact.

A further object of the invention is to provide a brine containing refrigerant which is capable of suitable variation to give either a slightly salty or a slightly sweetish taste to the product as may be desired.

Other objects of the invention will become apparent as embodiments thereof are described in greater detail hereinafter.

The refrigerant in its preferred form consists of a sodium chloride and sugar solution which is not excessively sweet, salty or bitter and therefore does not disagreeably flavor the food. The flavor of the refrigerant may be varied between slightly salty and sweetish, by varying the proportions of sodium chloride and sugar, depending upon the type of product that is being treated with the refrigerant. For freezing vegetables it may be desirable to use a slight excess of salt or sugar to bring out the characteristic flavor of the vegetables, while an excess of sugar may be used if fruits are being treated with the refrigerant.

Typical refrigerants vary in sugar and salt concentration from about 20 to 36% sugar and from about 18 to 10% of sodium chloride, if invert sugar is used as a base. With other sugars, viscosities and freezing point temperatures as well as flavoring characteristics usually narrow these limits.

The total amount of sugar and salt or total solids content of the refrigerant is extremely important in determining the characteristics of the refrigerant. For example, when the total solids content is appreciably above 54% there is a tendency for one or more of the constituents of the solution to separate out. Likewise, when the total solids content falls below about 30% a reaction takes place which materially alters the flavor of the refrigerant. The reason for the change in flavor of the refrigerant is that the sugar and salt apparently react when in suitable concentrations to form double compounds of the sugar and salt which are characterized by less solubility in water than either the sodium chloride or the sugar and, furthermore, by a neutral or only slightly sweetish and non-salty flavor.

The double compounds formed of sodium chloride and sugar in any particular combination of sugar or sugars and salt exist at a given temperature only if the water is below a specific percentage. Likewise double compounds with, for example, sucrose, dextrose and levulose do not have the same sweetness or a sweetness equal to the respective sugars. However, they reduce the quantity of uncombined sodium chloride present in the refrigerant with a lessening of the sodium chloride characteristics of the solution. The chemistry of these double compounds, their solubilities and physical properties, their effects on one another when in solution, and their solubility relationships as affected by excess sodium chloride, temperature and concentration are factors in producing the novel characteristics of the refrigerant. However, suitable concentrations of sugar and sodium chloride can be readily determined for the particular usage in accordance with the range of proportions set forth above.

The strength or total solids content of the novel refrigerant is controlled by several factors. For example, the solubility of a sugar will control the sugar concentration of the refrigerant. Different sugars, of course, have different degrees of solubility in water. For example sucrose and dextrose are less soluble than levulose. For that reason sucrose and dextrose are not as desirable as the more soluble sugars for freezing point depressants, although the fact that they can be obtained in dry form greatly facilitates their use.

Levulose is a very sweet sugar and a very soluble sugar, thereby allowing the production of refrigerants having a high total solids content, which are adapted to be used at low temperatures. As a consequence levulose is highly desirable as a base for sugar freezing solutions and for making sugar-salt refrigerants of the type contemplated by this invention. However, levulose is comparatively expensive and this, from an economic standpoint, is undesirable. Invert sugars have been found to be entirely satisfactory for use in making up refrigerants and the properties of such invert sugars can be improved by reducing the dextrose content thereof in accordance with the processes in my copending application, Serial No. 110,964, filed November 16, 1936. The sweetness of the refrigerant, also can be controlled by adding sucrose to the solution in amounts which are insufficient to adversely affect the viscosity of the solution or to cause crystallization of the sucrose therefrom upon reducing the temperature of the solution. The differences in the properties of the double compounds of different sugars with sodium chloride affect such additions.

The above considerations are the criteria on which is based the range of concentrations preferably used in refrigerants embodying the present invention.

The proportions of salt and sugar may be varied depending upon the type of product being treated. For example, it is well known that the flavor of vegetables is enhanced by the addition of a small amount of salt, and therefore an additional amount of salt may be included to impart to the refrigerant a slightly salty taste. Likewise, the flavor of fruits and berries is improved, as is well known, by the addition of sugar and therefore it may be desirable to use somewhat more sugar than the neutral flavored solution would normally contain, or a small amount of a sweeter sugar may be added in order to slightly sweeten products.

It has been found as a result of experimental and practical operations with various types of food products that about one part of sodium chloride to two parts of sugar produces a refrigerant which has the desired neutral flavor, that is, is not salty and only slightly sweetish.

Typical refrigerating solutions which have been found to be entirely satisfactory in actual commercial practice are as follows:

Example I

| | Per cent |
|---|---|
| Total solids content (determined by refractometer) | 35.75 |
| Sugars | 23.52 |
| Sodium chloride | 12.23 |

This solution was found to work with entire satisfaction in the refrigeration of peas.

Example II

Another solution which may be used for freezing peas consists of:

| | Per cent |
|---|---|
| Total solids | 32.75 |
| Sugars | 22.49 |
| Sodium chloride | 10.26 |

Example III

| | Per cent |
|---|---|
| Total solids | 52.75 |
| Sugars | 34.58 |
| Sodium chloride | 17.17 |

Example IV

| | Per cent |
|---|---|
| Total solids | 40.75 |
| Sugars | 29.24 |
| Sodium chloride | 11.51 |

Examples I to IV may be used for refrigerating many different types of vegetables and fruits.

Example V

A solution that works well on corn-on-the-cob consists of:

| | Per cent |
|---|---|
| Total solids | 37.70 |
| Sugars | 24.68 |
| Sodium chloride | 13.02 |

In the above refrigerants, the sugar consists of a major proportion of invert sugar and may, in fact, consist entirely of invert sugar. However, a minor proportion of the sugar may be sucrose.

The above solutions, in use, are subject to continued dilution because water is added to the solution by removal of the moisture which is associated with the product, or added in washing and/or blanching of the article prior to refrigeration. Dilution of the refrigerant can continue to a point at which the double compounds formed from the sugar and sodium chloride break down and then the desired characteristics of the freezing solution are lost. Analyses of refrigerants from which solids are beginning to separate at operating temperatures of 12° to 14° F., indicate that such separation occurs when the total solids content is reduced to about 30%. When the total solids content is reduced to about 30%, at least a portion of the refrigerant should be withdrawn and reinforced by the addition of sugar and salt thereto.

A typical solution that needs reinforcement contains:

| | Per cent |
|---|---|
| Total solids | 30.66 |
| Sugars | 20.64 |
| Sodium chloride | 10.02 |

The refrigerant may be reinforced by determining the total solids content of the refrigerant and thereafter adding sugar and salt to the refrigerant. The amount of salt and sugar that is to be added may be determined by measuring the total solids, by means of a refractometer. The sodium chloride content may be determined conveniently by titrating with silver nitrate in the presence of a potassium chromate indicator. By deducting the percentage of sodium chloride from the total solids the approximate sugar content can be determined. Sugar and salt may then be added to bring the solution to the desired concentration. It is preferable to add dry salt to the solution that needs reinforcement and then add concentrated sugar syrup to bring the solution up to the required strength. The reason for this is that sugar dissolves very slowly in concentrated brine solutions whereas even dry salt dissolves quite readily in the concentrated sugar solution.

A typical example of a process for refrigerating green peas by means of the novel refrigerant consists of spreading the peas on a conveyer which is passed through a refrigerating tunnel that has a capacity of about 1000 pounds per hour at such a rate that the peas are subjected to the action of the refrigerant for about fifteen minutes. The peas carry on their surfaces 4% of water after they have been blanched and cooled. A refrigerating solution having a temperature of about +11° F. ±2° F. is sprayed on the peas and recirculated at the rate of about 160 gallons per minute, which causes the surfaces of the peas to freeze almost immediately. One hundred and fifty gallons of refrigerant are used in the apparatus at the start. A typical refrigerant contains about 39% total solids consisting of 24% invert sugar, 2% sucrose and 13% sodium chloride. This refrigerant may be made by dissolving a mixture of 92% invert sugar and 8% sucrose in water to produce a solution containing 52% sugar and mixing with the first solution an equal amount of a saturated sodium chloride solution containing 26% of sodium chloride by weight. The solutions were combined by agitating the sugar solution while adding slowly an equal volume of the sodium chloride solution. The solution may also be made by dissolving dry sodium chloride in dilute or more concentrated sugar solutions to produce the desired total solids content.

The refrigerant was sprayed into the refrigerating tunnel and the peas passed through the tunnel at the rate indicated above. The water film on the surface of the peas was washed off into the refrigerant and diluted the same; the water film being replaced by a film of the refrigerant, this interchange resulting in a decrease in the total volume and dilution of the refrigerant.

When sufficient water has been taken up by the refrigerant to reduce the total solids content to about 30–34%, the solids begin to separate out on the heat exchanger inside which ammonia is boiling at 7° F. or lower. The separation of a small amount of material does not, as a rule, interfere greatly with the operation of the refrigerating system or make it impossible to maintain the refrigerant at 13° F. or slightly lower, although eventually there is a sufficient separation of solids to be bothersome. At this time the freezing solution in the apparatus is reinforced, while operation is continued, by withdrawing a third to one-half of the refrigerant and substituting therefor a substantially equal volume of concentrated solution of sugar and salt.

In order to demonstrate the change in total solids content, samples of the refrigerant were analyzed as successive 500 lb. quantities of peas were frozen. The refrigerating solution, as indicated above, contained about 39% of total solids at the beginning of the refrigerating operation. The peas had a film of moisture thereon, weighing about four pounds per hundred pounds of peas, which diluted the refrigerant during freezing. The frozen peas withdrew from the apparatus about 7 pounds of the refrigerant per 100 pounds of peas. The following table summarizes the results, in pounds, of freezing the peas at the rate of 1000 pounds per hour with 1350 lbs. of freezing solution in the apparatus at the start. Columns 5 and 6 of the table indicate the amount of water that would be added to the refrigerant by reinforcing the refrigerant with invert sugar in proportion to the amount of invert sugar removed.

The process cannot be commercially practiced without loss of freezing solution. However, by adding invert sugar which contains from 20% to 25% of water to bring the solution up to the proper concentration and volume, it is found that the freezing solution can be maintained at the desired solid content from the beginning to the end of the run without appreciable decrease in volume.

Table A

| 1 | 2 | | 3 | 4 | 5 | 6 |
|---|---|---|---|---|---|---|
| Time elapsed hours | Sugar removed | | Salt removed | Water removed | Replacing the invert sugar adds the following water | Water balance (as against original solution) |
| | Invert | Sucrose | | | | |
| 1 | 16.43 | 1.37 | 8.9 | 3.2 | 5.2 | +2.0 |
| 2 | 32.36 | 2.70 | 17.53 | 7.4 | 10.2 | +2.8 |
| 3 | 47.82 | 3.99 | 25.91 | 12.28 | 15.11 | +2.83 |
| 4 | 62.80 | 5.24 | 34.02 | 17.94 | 19.84 | +1.90 |
| 5 | 77.30 | 6.45 | 41.88 | 24.37 | 24.43 | +0.06 |
| 6 | 91.34 | 7.62 | 49.48 | 31.56 | 28.86 | −2.70 |

During the six hours of the run, 6000 lbs. of peas were frozen and delivered in a frozen or solidified state with approximately one-half per cent more water on their surfaces than was present when they started into the freezing tunnel. The frozen peas acquired a coating containing about 99 lbs. sugar and 50 lbs. of salt as flavoring. This is about 0.0165 lb. of added sugar and about 0.0082 lb. of added salt per pound of frozen peas, which is less than the amount usually used in canning peas. Therefore, the amount of flavoring added to the peas is less than the amount which is normally present in canned peas.

The flavor of the refrigerant should be determined by tasting at or below freezing temperature, for the reason that there is a tendency for the salt and sugar to separate from the double compound and to give the characteristic sugar and salt flavor, if the refrigerant is allowed to become warm and diluted, as is usually the case when materials are tasted.

It will be understood from the foregoing that refrigerants embodying the present invention are highly desirable for use in the refrigeration of many different types of food stuffs because they can be maintained at substantially constant concentration while in use and at the same time will not impart undesirable flavoring characteristics to the products being treated.

Processes utilizing the novel refrigerant likewise are highly efficient and may be practiced with any of the usual types of spray or immersion freezing apparatuses and therefore the process lends itself to ready commercial adaptation for a treatment of substantially any and all types of food products.

It will be understood, of course, that the sugar and salt content of the refrigerant may be varied within the limits set forth above and other flavoring materials may be added to impart desirable characteristics to the refrigerant without departing from the invention. Therefore, the examples given above should be considered as illustrative only and not as limiting the scope of the following claims.

I claim:

1. A refrigerant for freezing foods, comprising a solution of sodium chloride and sugar, said solution containing between about 10% and 18% salt, and between 20% and 36% sugar.

2. A neutral flavored refrigerant for freezing foods, comprising an aqueous solution of between about 10% to 18% sodium chloride and 20% to 36% of sugar, the sugar concentration being about twice as great as the concentration of the sodium chloride.

3. A neutral flavored refrigerant comprising an aqueous solution containing about 30% to 54% total solids consisting of sodium chloride and sugar in which the sugar is present in the proportion of between about one and four parts to one part of salt.

4. A neutral flavored refrigerant comprising an aqueous solution of sugar and containing between about 10% and 18% sodium chloride, the percentage of salt being about one-half the percentage of invert sugar in the solution.

5. A refrigerant for freezing foods comprising an aqueous solution of sucrose, invert sugar and salt in about the proportions of about 2% sucrose, 20% to 34% of invert sugar and 10% to 18% of sodium chloride, the percentage of sodium chloride being about one-half the percentage of total sugars.

6. A refrigerant for direct contact freezing of foods and characterized by a slightly sweetish taste comprising an aqueous solution of sodium chloride and sugar capable of being refrigerated below the freezing point of the food without becoming excessively viscous or crystalline in which the concentration of sugar is at least equal to the concentration of the sodium chloride.

7. A refrigerant free from salty or bitter taste comprising an aqueous solution containing about one part of sodium chloride and about two parts of invert sugar and sucrose, the sucrose being in a minor proportion, said sodium chloride and sugars forming a total solids content of between about 30% and 54%.

8. The process of quick freezing foods which comprises spraying a refrigerated solution of salt and sugar on the comestibles, said solution containing between about 30% to 54% total solids consisting of about 10% to 18% sodium chloride and about 20% to 36% of sugar.

9. The process of freezing foods comprising applying to the foods a refrigerated solution of sodium chloride and sugar, which is free of salty and bitter taste and in which the total sodium chloride and sugar content is between about 30% and 54%.

10. The process of making a refrigerant that is free of salty or bitter taste which comprises adding salt to a solution of invert sugar to produce a solution containing about one part of sodium chloride to between about one to four parts of invert sugar and a total sodium chloride and sugar content of between about 30% and 54%.

11. A process of freezing foodstuffs comprising applying to the foodstuffs a refrigerated solution of sodium chloride and sugar, which is free of salty or bitter taste, and in which the total sodium chloride sugar content is between about 30 and 54%, of which at least one-half is sugar, withdrawing said foodstuffs when frozen from contact with said refrigerant, whereby a portion of said refrigerant is removed and its total sugar and sodium chloride content is reduced, withdrawing a portion of the refrigerant when the total sugar and sodium chloride content approaches 30%, determining the amount of sodium chloride and sugar remaining in the refrigerant, and adding sufficient sodium chloride and sugar solution to increase the concentration of the refrigerant to that initially present.

HARRY A. NOYES.